United States Patent

Okada et al.

(10) Patent No.: US 9,497,493 B2
(45) Date of Patent: Nov. 15, 2016

(54) VIDEO TRANSMISSION DEVICE, VIDEO RECEPTION DEVICE, AND VIDEO COMMUNICATION SYSTEM

(75) Inventors: Mitsuhiro Okada, Yokohama (JP); Hironori Komi, Tokyo (JP); Taku Nakamura, Yokohama (JP); Tomoyuki Myojin, Tachikawa (JP); Hiroki Mizosoe, Kawasaki (JP); Yusuke Yatabe, Yokohama (JP)

(73) Assignee: Hitachi Maxell, Ltd., Osaka (JP)

( * ) Notice: Subject to any disclaimer, the term of this patent is extended or adjusted under 35 U.S.C. 154(b) by 669 days.

(21) Appl. No.: 12/955,454

(22) Filed: Nov. 29, 2010

(65) Prior Publication Data

US 2011/0247033 A1   Oct. 6, 2011

(30) Foreign Application Priority Data

Mar. 31, 2010   (JP) ................. 2010-080102

(51) Int. Cl.
*H04N 7/173* (2011.01)
*H04N 21/236* (2011.01)
*H04N 19/61* (2014.01)

(52) U.S. Cl.
CPC ........ *H04N 21/23611* (2013.01); *H04N 19/61* (2014.11)

(58) Field of Classification Search
USPC ............. 725/62–71, 91–96, 114–118
See application file for complete search history.

(56) References Cited

U.S. PATENT DOCUMENTS

| | | | |
|---|---|---|---|
| 6,940,874 B2 * | 9/2005 | Ruszczyk et al. | 370/516 |
| 7,849,489 B2 * | 12/2010 | Bunn et al. | 725/111 |
| 7,865,917 B2 * | 1/2011 | Hellman | 725/14 |
| 7,974,200 B2 * | 7/2011 | Walker et al. | 370/235 |
| 8,392,955 B2 * | 3/2013 | Shaul | 725/95 |
| 2002/0116719 A1 * | 8/2002 | Dapper et al. | 725/116 |
| 2003/0037337 A1 | 2/2003 | Yona et al. | |
| 2006/0007956 A1 * | 1/2006 | Costa | 370/468 |
| 2006/0085551 A1 | 4/2006 | Xie et al. | |
| 2007/0074266 A1 * | 3/2007 | Raveendran et al. | 725/135 |
| 2007/0091789 A1 | 4/2007 | Thukral | |

(Continued)

FOREIGN PATENT DOCUMENTS

| | | |
|---|---|---|
| EP | 1 817 680 | 8/2000 |
| JP | 10-308932 | 11/1998 |

(Continued)

OTHER PUBLICATIONS

Extended European Search Report, issued in European Patent Application No. 10 014 988.9, dated Mar. 28, 2012.

*Primary Examiner* — Nasser Goodarzi
*Assistant Examiner* — Fred Peng
(74) *Attorney, Agent, or Firm* — McDermott Will & Emery LLP

(57) ABSTRACT

A video communication system having: an encoder coding input video data and outputting a video stream; and a packet processing part grouping into packets the output video stream from said encoder and outputting the same to a communication path; wherein said packet processing part generates an original data cluster consolidating a packet for each group of a prescribed number of MB processes and redundant data for correcting data errors of said original data cluster; and controls the insertion quantity of redundant data so that the combined number of bits of said original data cluster and said redundant data works out to be equal to or less than the target number of bits.

3 Claims, 19 Drawing Sheets

(56) References Cited

U.S. PATENT DOCUMENTS

| | | | |
|---|---|---|---|
| 2008/0115185 A1* | 5/2008 | Qiu et al. | 725/118 |
| 2008/0288986 A1* | 11/2008 | Foster et al. | 725/62 |
| 2010/0132002 A1* | 5/2010 | Henocq et al. | 725/118 |
| 2011/0010607 A1* | 1/2011 | Raveendran | 714/776 |
| 2011/0110260 A1 | 5/2011 | Yoneda et al. | |

FOREIGN PATENT DOCUMENTS

| | | |
|---|---|---|
| WO | WO 03/009577 A2 | 1/2003 |
| WO | WO 2006/044138 A1 | 4/2006 |
| WO | WO 2010/001625 A1 | 1/2010 |

* cited by examiner

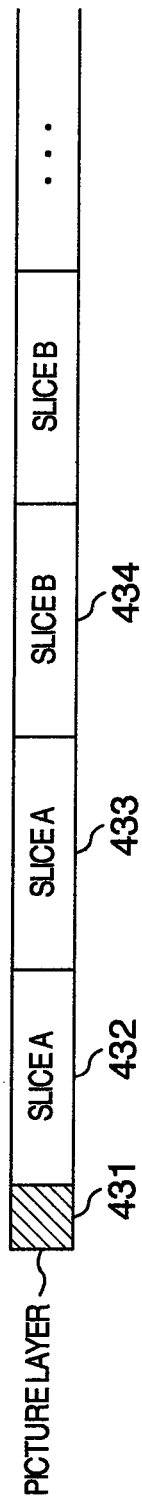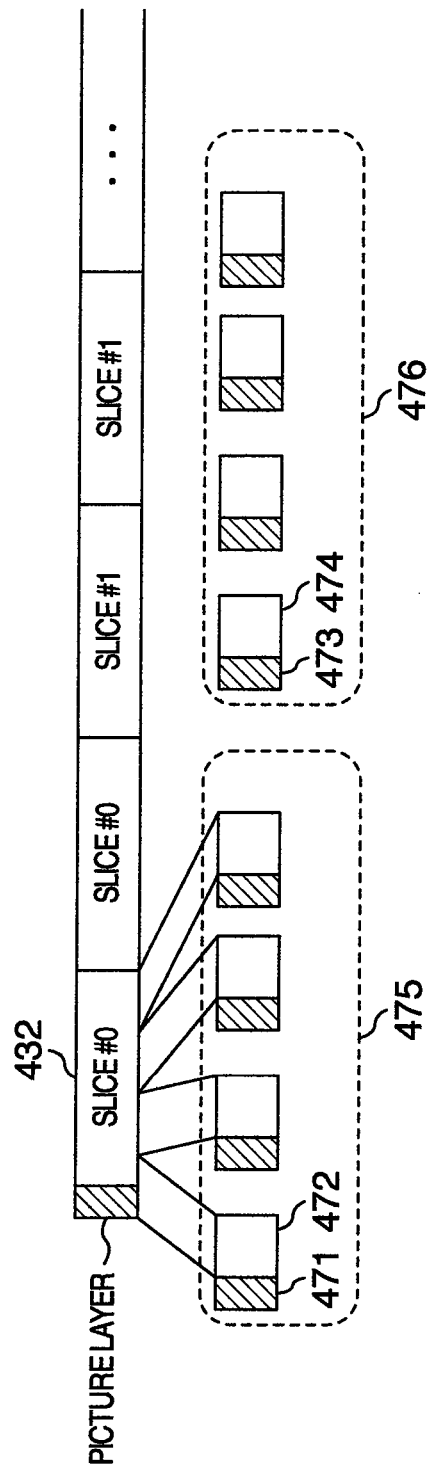

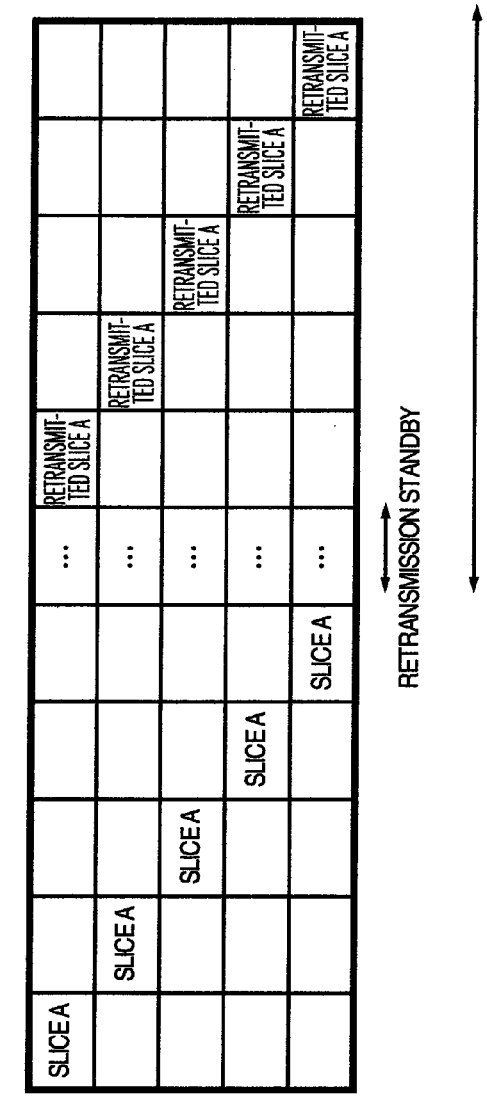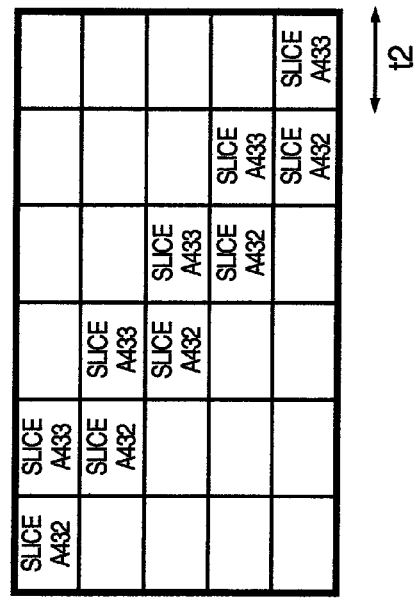

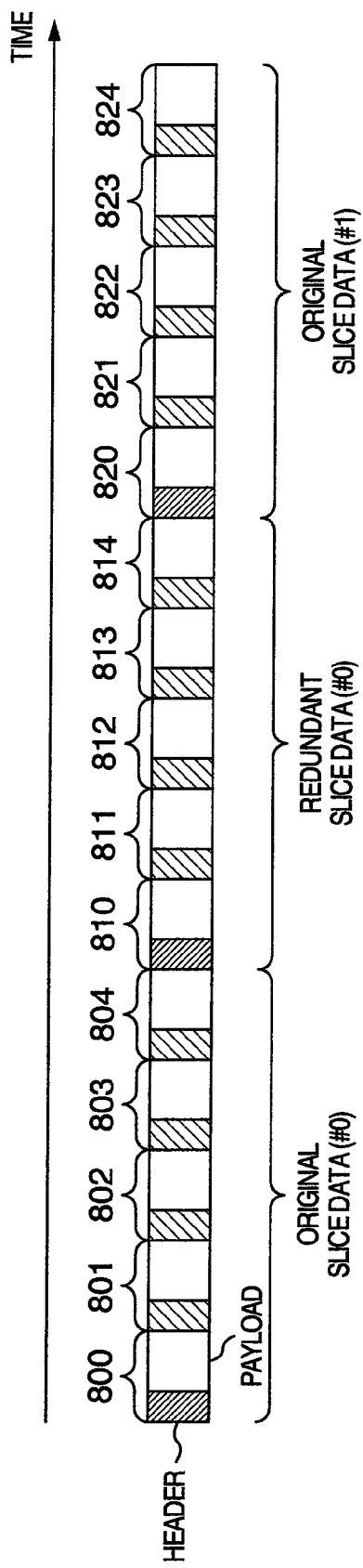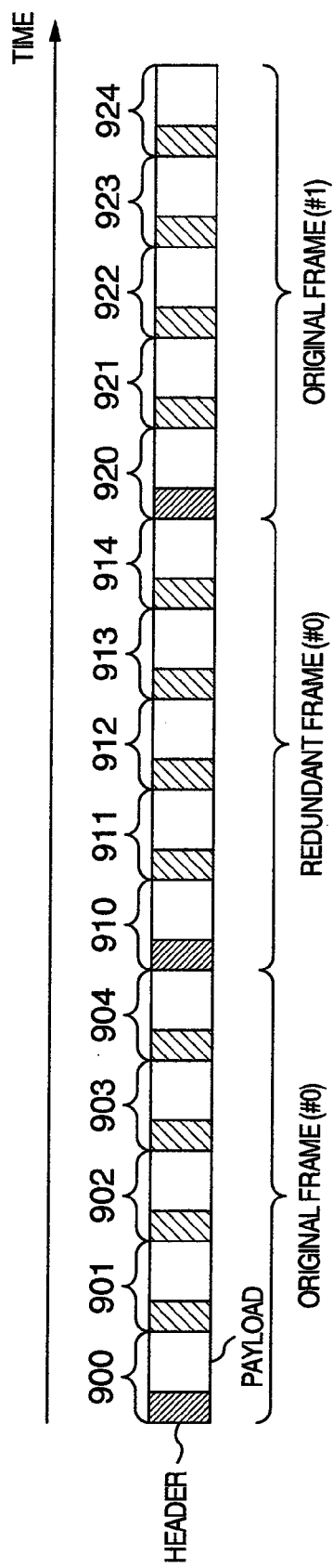

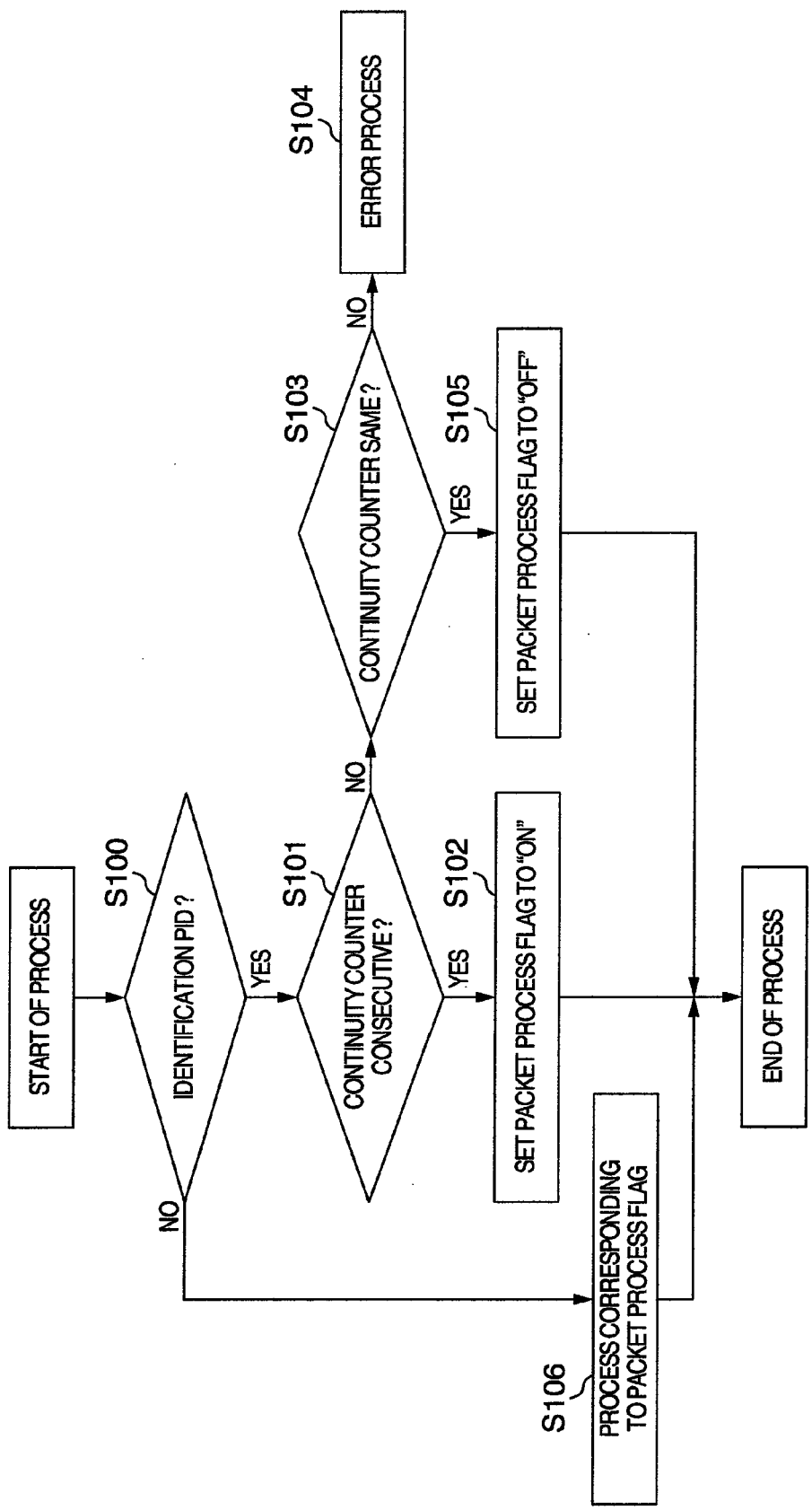

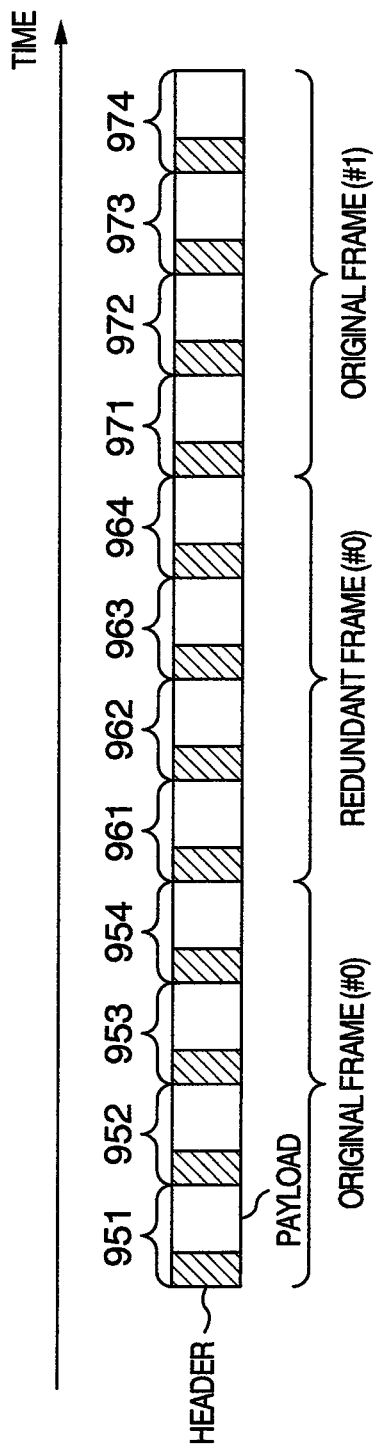

VIDEO TRANSMISSION DEVICE, VIDEO RECEPTION DEVICE, AND VIDEO COMMUNICATION SYSTEM

INCORPORATION BY REFERENCE

The present application claims priority from Japanese application JP2010-080102 filed on Mar. 31, 2010, the content of which is hereby incorporated by reference into this application.

BACKGROUND OF THE INVENTION

The present invention pertains to a video transmission device, a video reception device, and a video communication system.

As background art of the present technical field, there is e.g. JP-A-1998-308932 (Patent Reference 1). In the concerned publication, it is mentioned that:

"'Problem': To provide, in a data communication method, technology capable of carrying out video data error and loss recovery in addition to ensuring low delay characteristics and real-time characteristics.

'Solving Means': In a data communication method in which video data generated in real time node-to-node or end-to-end are communicated with high quality and in real time and taking a plurality of bundled communication packets to be a block, an acknowledgment reply including an ACK signal indicating that each of the transmission packets inside a block has been received correctly, or an acknowledgment reply including a NAK signal indicating that some transmission packet inside a block has not been received correctly, is generated in block units on the receiving side and returned to the transmitting side and, in the case where the acknowledgment reply in block units from the aforementioned receiving side includes a NAK signal, on the transmitting side, several of only those transmission packets for which retransmission is necessary are copied and retransmitted to the receiving side."

SUMMARY OF THE INVENTION

Conventionally, there are video communication systems such as onboard cameras which check the rear of a car. Since a driver carries out driving while checking the video images of the camera with a monitor, it is desirable to reduce the delay from image recording to display on the monitor and to implement a system with low delay. Since activities are carried out with respect to images displayed by game consoles, video telephones, and the like, as well, there is a need to implement the time period from video image export to display to have a low delay. In the case where the bit rate at which communication from video image export to the displaying monitor is possible is low, the system is implemented by carrying out information compression before exporting the video images and decompressing the same on the monitor side.

In JP-A-1998-308932, there is shown a device that communicates a video stream generated in real time between two points with low delay. With this device, a reply indicating that a communication unit packet has been correctly received, or failed, is returned from the receiving side to the transmitting side, and the transmission side retransmits the packet in accordance with the reply.

In the aforementioned JP-A-1998-308932, a video data retransmission request is carried out after detecting an error in the video stream communication and the reception device is unable to carry out decoding processing of the video data during the time until the video data are retransmitted in order to carry out error correction, so there arises a delay in data communication.

Also, in the case of connecting a multitude of reception devices to a transmission device and making a broadcast, it is exceedingly difficult for the transmission device to individually reply to the retransmission request of each reception device and make a retransmission when an error is generated.

The present invention has for an object to provide a video communication system capable of communicating video data by suppressing delay generation while providing error robustness.

The aforementioned object is attained by the invention set out in the patent claims.

According to the present invention, it is possible to provide a video communication system capable of communicating video data by suppressing delay generation while providing error robustness.

Other objects, features and advantages of the invention will become apparent from the following description of the embodiments of the invention taken in conjunction with the accompanying drawings.

BRIEF DESCRIPTION OF THE DRAWINGS

FIG. 5 is a diagram showing a picture data structure example associated with Embodiment 1.

FIG. 6 is a diagram showing an example of TS packets associated with Embodiment 4.

FIGS. 7A and 7B are diagrams showing examples of pipelines indicating the error correction time of a slice A associated with Embodiment 1.

FIG. 17 is a diagram showing an example of a TS packet generation method associated with Embodiment 4.

FIG. 18 is a diagram showing an example of a TS packet generation method associated with Embodiment 5.

FIG. 19 is a diagram showing an example of a data absence judgment and redundant data destruction method associated with the TS packet in FIG. 18.

FIG. 20 is a diagram showing an example of a TS packet generation method associated with Embodiment 5.

DESCRIPTION OF THE EMBODIMENTS

Hereinafter, the embodiments of the present invention will be described using the drawings.

First Embodiment

Figure 1:
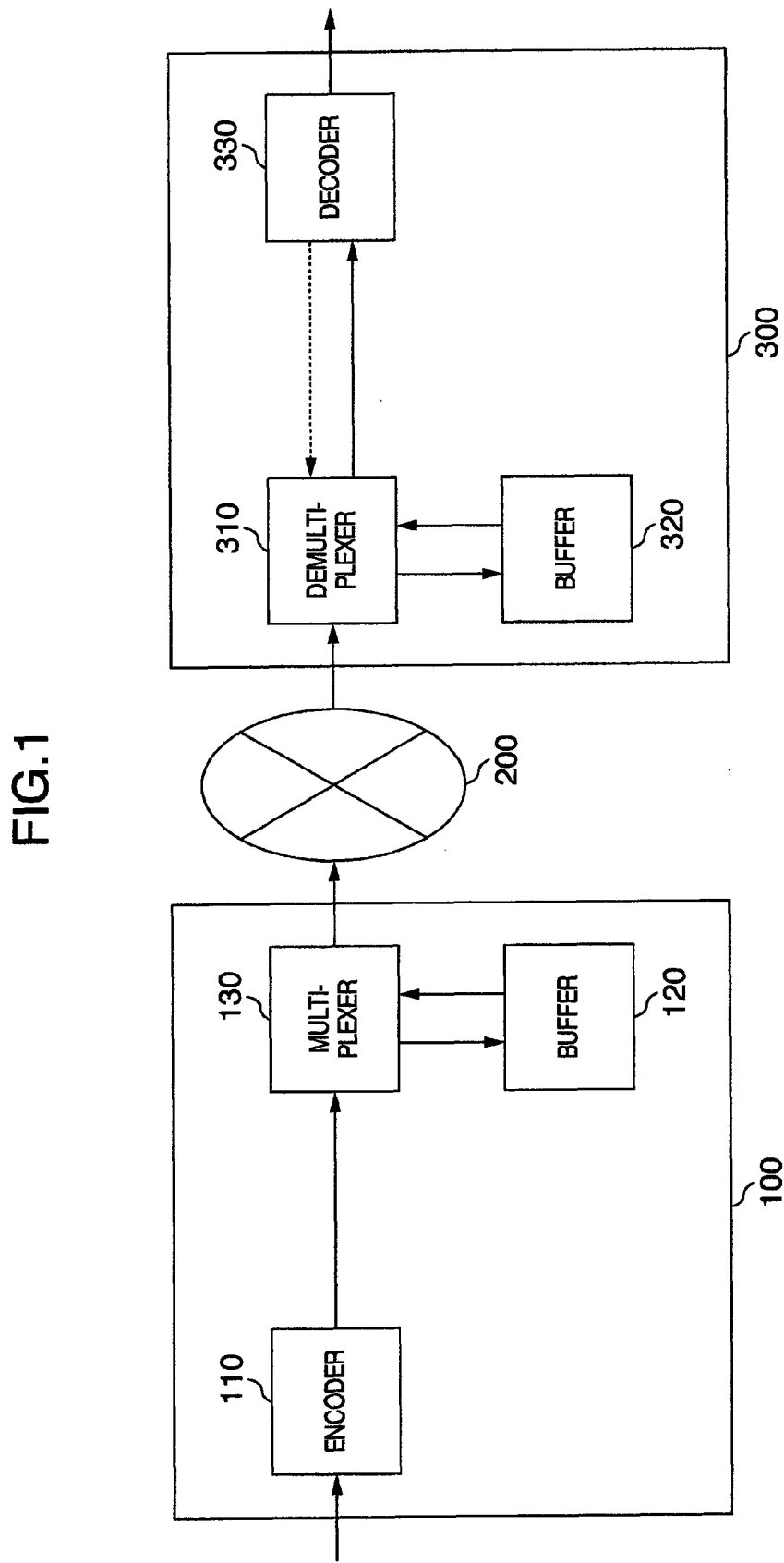
FIG. 1 is a schematic diagram showing a video communication system associated with Embodiment 1.

FIG. 1 is a schematic diagram showing an example of a video communication system consisting of a video transmission device 100, a network 200, and a video reception device 300.

Video communication system 100 is constituted by an encoder 110, a buffer 120, and a multiplexer 130.

Encoder 110 receives video data, encodes the same, and outputs a video stream.

As representative examples of coding, MPEG2 Video (ISO/IEC 13818-2 Video) and the like are known.

Buffer 120 is a medium that stores the video stream that is output by multiplexer 130.

Multiplexer 130 receives the video stream from encoder 110 and stores the same in buffer 120. Thereafter, it reads the video stream from buffer 120, divides up the same into packets which are the units of communication and outputs the same to network 200. As an example of packetization, there is known TS (Transport Stream) which is defined by MPEG (Moving Pictures Expert Group).

A video reception device 300 is constituted by a demultiplexer 310, a buffer 320, and a decoder 330.

Demultiplexer 310 receives packets from network 200, carries out packet reception processing, packet analysis processing, buffer 320 loading processing, and buffer 320 readout processing, and outputs to decoder 330.

Buffer 320 is a medium that stores the video stream that is output by demultiplexer 310.

Decoder 330 receives the video stream from demultiplexer 310, carries out decoding processing, and outputs video data. Also, it outputs error detection control information when there is detection of a communication error.

The video stream is layered, encoded, and communicated. Using FIG. 2, there is given an explanation of the data layer structure at the time when video images are encoded and communicated using the MPEG-2 Standard.

Encoder 110 divides up the video data into macroblocks (MB) which are coding processing units, carries out motion estimation coding, frequency conversion, and quantization, and carries out variable-length coding to generate macroblock data 410.

Slice 420 is data including at least one macroblock data item and possesses a slice header 421 which is a characteristic code within the video stream. Picture 430 is a data item constituting a display screen including one or more slices and possesses a picture header 431 which is a characteristic code within the video stream.

GOP (Group Of Pictures) 440 is a data item including one or more pictures, the head data items being entirely constituted by macroblocks on which coding has been carried out within the screen. In this case, it is possible to decode the display screen using only the head picture data items. As for the macroblock data items included in the following pictures, it is possible to select inter-screen coding carrying out motion compensation by consulting the previously decoded picture data. At the head of GOP 440, there is carried inside the video stream a GOP header 441 which is a characteristic code.

Sequence 450 is a data item including one or more GOP's and is equivalent to a video stream that is output by encoder 110. At the head of sequence 450, there is carried inside the video stream a sequence header 451 which is a characteristic code.

Sequence 450 is divided up into PES (Packetized Elementary Streams) 460 in multiplexer 130 and a PES header 461 is appended.

PES 460 is divided up into TS packets 470 which are communicated units. TS packet 470 is a fixed-length packet with 188 bytes to which a PID which is an identification number for distinguishing data items which are communicated in the front and a TS header 471 including a continuity counter for detecting losses of TS packets with a continuous counter there are appended.

Figure 3:
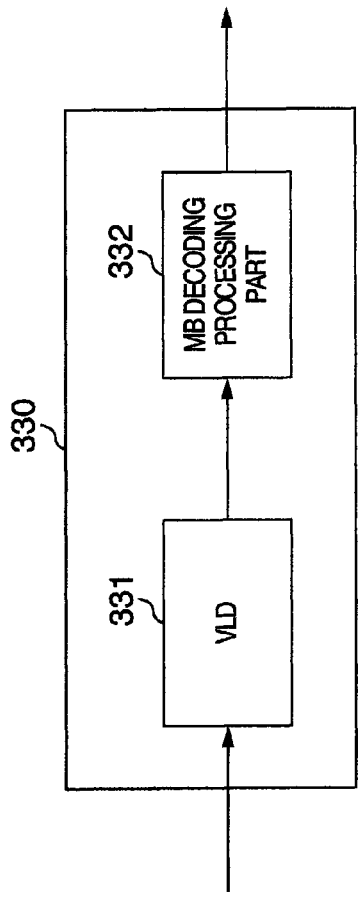
FIG. 3 is a diagram showing a configuration example of a decoder associated with Embodiment 1.

FIG. 3 is a diagram showing the configuration of decoder 330. Decoder 330 is constituted by a VLD (Variable Length Decoder) 331 and an MB decoding processing part 332.

VLD 331 receives the video stream, i.e. sequence 450, detects GOP header 441, picture header 331, and slice header 421, and carries out variable length decoding from the head position of macroblock data 410.

MB decoding processing part 332 receives macroblock data 410 from VLD 331 after variable length decoding has been carried out, carries out reverse quantization, reverse frequency conversion, and motion compensation, and outputs the video data.

Here, the decoding processing of VLD 331 when a communication error is generated in the communication of the video stream will be described using FIG. 4.

Figure 4:
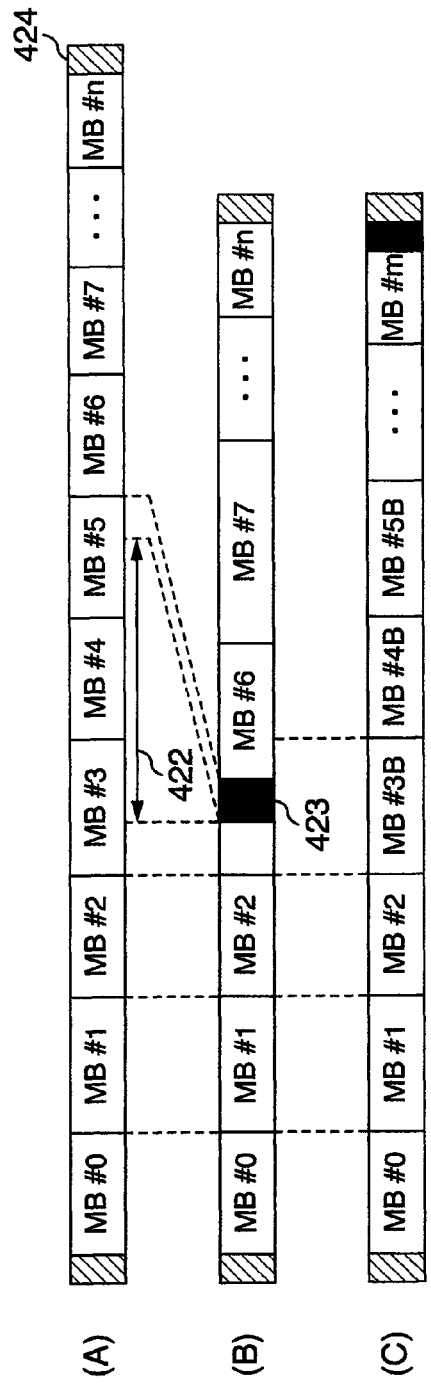
FIG. 4 is a diagram showing an output example of a decoder VLD 331 associated with Embodiment 1, at the time when a communication error is generated.

FIG. 4 Row A shows slice data that are output by encoder 110, including macroblock data items from MB#0 to MB#n.

FIG. 4 Row B shows slice data received by decoder 330 via network 200 when the TS packet corresponding to error generation part 422 has been lost due to a communication error at the time when slice data of FIG. 4 Row A are divided up into TS packets and are communicated via network 200.

FIG. 4 Row C shows the arrangement of macroblock data that have been decoded and interpreted from slice data of FIG. 4 Row B by VLD 331. Since header information being a characteristic code is not attached to the macroblock data within the stream, when VLD 331 decodes the video stream of FIG. 4 Row B, it cannot carry out variable length decoding while checking whether the boundary of the macroblock data matches that of FIG. 4 Row A. Consequently, in the variable length decoding of MB#3, even if the non-consecutive trailing data item 423 of MB#5 is input after the head portion data of MB#3, VLD 331 proceeds with the processing without recognizing that the data are non-consecutive and recognizes, using data partway into MB#6, that macroblock data of MB#3B is included in the slice data. Hereafter, since VLD 331 advances the variable length decoding processing using the erroneous macroblock data boundary, it outputs macroblock data that differ from those of FIG. 4 Row A.

Since VLD 331 performs variable length decoding of MB#(m+1), it can detect for the first time that the recognition of macroblock boundaries is erroneous when loading slice header 424.

In the present embodiment shown in FIG. 5, multiplexer 130 is configured to output, after the slice data included in the picture data, the same slice data redundantly. The number of MB's included in the slice data is predetermined to be a fixed number in video transmission device 100 and video reception device 300 and on the occasion of VLD 331 performing variable length decoding of slice A 432, it makes a matching comparison of whether, as the next data item of the video stream, a slice header being a characteristic code is present when decoding the amount of data corresponding to the predetermined MB's. In case there is no match with the slice header, an error detection control signal is sent to demultiplexer 310 and MB decoding processing part 332 and next, there is carried out variable length decoding of slice A 433 sent from demultiplexer 310.

Figure 9:
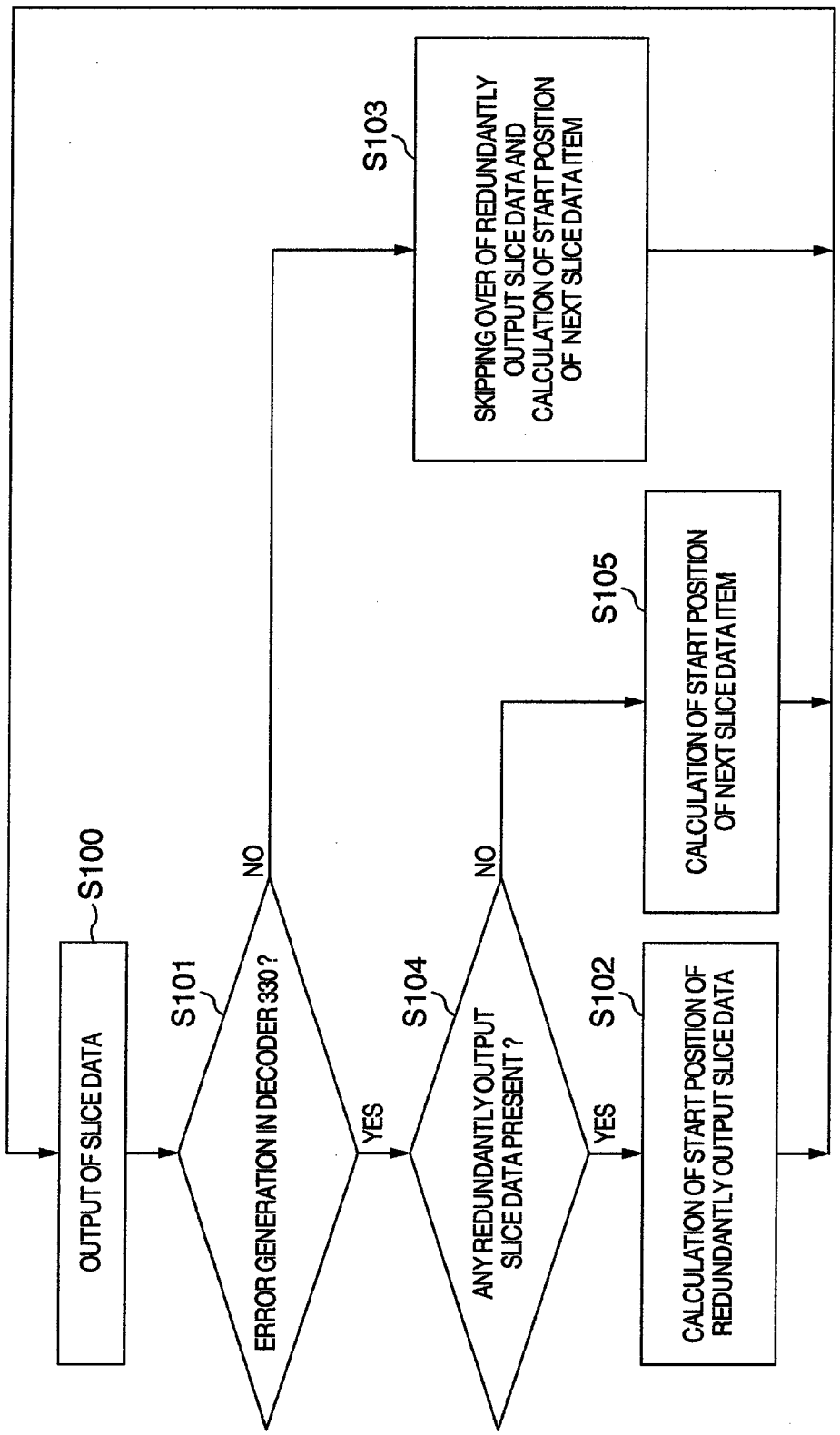
FIG. 9 is a diagram showing an example of a control flow of a demultiplexer 310 associated with Embodiment 1.

As shown in FIG. 9, in case demultiplexer 310 receives an error detection control signal (Step S102), there is output slice A 433 which has been output redundantly and in case no error detection is received (Step S103), slice B 434 is output.

In case MB decoder processing part 332 has not received an error detection control signal, the decoding processing result of the macroblock data included in slice A 432 is destroyed and next, there is carried out decoding processing of the macroblock data included in slice A 433 input from VLD 331 and the result thereof is output.

In the aforementioned example, it was taken that the number of MB's included in the slice data is predetermined, but the number of MB's included in the slice data may also, each time a video stream is transmitted, be determined by carrying out communication with video transmission device 100 and video reception device 300.

On the occasion of VLD 331 performing variable length decoding processing of slice A 432, the system may be devised so that it sends an error detection control signal to demultiplexer 310 and MB decoding processing part 332 to carry out variable length decoding of the following slice A 433 when a slice header is detected during processing of macroblock data.

In the communication system of the present embodiment, there are used I pictures for which inter-screen consultation is not carried out and P pictures for which only forward direction estimation is carried out. In this way, it is possible to make the order of decoding the picture data and the displaying order be the same, so it is possible to restrain the time until display start to a low delay by not generating delays due to rearranging the decoding order and the displaying order.

Also, by uniformly rate controlling the dispersion of bit rates by slice unit, it is possible to start the communication of slice data before the encoding processing of a picture comes to an end and, even if decoding when several slices have just been stored in buffer 320, output image data in real time without causing an underflow or overflow of buffer 120 and buffer 320. E.g., even if there is a dispersion in the bit rates with respect to the target coding volume for each slice, if it is possible to ensure a convergence toward the target bit rate with five slices, it is acceptable to perform multiplexing processing with encoder 110 at the stage when a stream corresponding to five slices has been generated, communicate at the target bit rate, and start decoding at the stage when data corresponding to five slices have likewise been received with video reception device 300. Making the rate converge with several slices is generally possible to implement by controlling the quantization step for each MB during slice coding while observing the level of margin with respect to the target bit rate. In this way, it is in principle possible to construct a plural-slice low-delay communication system. In the case of constructing a slice with a 1 MB line (16 lines long) of an image with the HD (High Definition) size of 1920×1080 pixels, there is a delay of approximately 0.5 ms, and in case the bit rate converges with five lines as mentioned above, communication with a low delay of 5 ms in total becomes possible since video transmission device 100 and video reception device 300 each have a delay of 2.5 ms.

Next, a description will be given regarding a method of raising error robustness while maintaining low delay.

By redundantly outputting slice data, e.g. in the case where there is a probability of 30% of a slice data communication error being generated during communication, the probability of being able, for any one data item, to communicate without causing a communication error increases. I.e., in the example of FIG. 5, since two slice data items are output, the probability of there arising an error in two slices and not being able to correctly communicate the slice data works out to 30%×30%=9%. In this way, by transferring a plurality of slice data items, it is possible to raise the error robustness.

Also, as shown in FIGS. 7A and 7B, the packet reception processing, packet analysis processing, buffer 320 loading processing, and buffer 320 read-out processing, carried out with demultiplexer 310, as well as the variable length decoding processing carried out by VLD 331 are performed with pipelining. As mentioned in the prior art example shown in FIG. 7A, in the case of correcting an error by retransmitting the data, when the error is detected with variable length decoding processing, there is a need to temporarily clear the pipeline during processing and resume pipeline processing after waiting for the retransmitted data, so a time t1 is required until slice A is correctly variable length decoded. Moreover, since, in the present embodiment shown in FIG. 7B, the slice data are sent redundantly, in case a communication error is detected with the VLD, processing can proceed without the pipeline processing being cleared, so slice A can be correctly variable length decoded in a time t2. Demultiplexer 330 and VLD 331 can easily process at a higher speed than the bit rate of the video stream, so slice A data on which error correction have been performed can be obtained with about the delay of VLD processing for one slice. Since the processing of multiplexer 130 on the communication side is likewise pipelined, a delay which is the same as on the decoding side is generated in case data are retransmitted.

Accordingly, the video communication system shown in the present embodiment is capable of implementing low delay and high error robustness.

Also, when an error has been generated in the video stream, since video data are replaced in slice data units, a decoder error correction circuit becomes unnecessary, so error correction is possible at a low cost.

In addition, since units of data groups making slice headers, characteristic codes within the video stream, redundant are taken, it is possible to detect the error with certainty and error correction using redundant data groups becomes possible.

Also, using slice headers, which are characteristic codes within the video stream, the decoder becomes capable of detecting data group errors.

Further, in the example shown in FIG. 1, one video reception device 300 connected with network 200 was taken, but two or more video reception devices may be connected. In the present scheme, even if an error is generated in a video reception device, since it is possible to make a correction without carrying out a retransmission request to video transmission device 100, it is possible to configure a video communication system without the load of video transmission device 100 increasing.

In the example shown in FIG. 4, error detection was carried out with the slice header as a trigger, but there may also be taken to be an error when a code which is not in the code table for carrying out decoding when variable length decoding is carried out with VLD 331.

In the example shown in FIG. 5, the identical slice data items included in the picture data were taken to be two, but decoding processing may also be carried out so that encoder 110 includes three or more slice data items. By increasing the slice data that are output redundantly, even in the case where an error is included in the redundantly output slices, it becomes possible to obtain a slice with no error with a low delay.

In the example shown in FIG. 5, a redundant slice is inserted for each slice, but redundant slice output may also be carried out in units of multiple slices. By opening up the interval between slice data transmitted in the beginning and redundantly output slice data, avoidance becomes possible even if errors are generated with a concentration in a specific portion.

In the following, there will be mentioned points of attention in the case of particularly attempting to implement a reduction in delay on the order of several milliseconds in Embodiment 1. Normally, there is determined an upper data limit at which processing is possible due to communication path restrictions and restrictions in the processing speed of TS packet generation and if it is the case that data are generated at or above the upper limit of the restrictions, the result is that data are stored in a buffer, resulting in a delay. Further, since the video reception device controls, assuming that the delay of the video transmission device is fixed, the start timing of decoding and the display timing of decoded images, there arises the problem that an image is displayed before decoding processing comes to an end. This is called image failure. In order to devise the system so that this image failure does not occur, the rate is fixed in units of slices or a prescribed number of MB's, and the system must be devised so that there is no delay, but generally, it is difficult to fix the rate in units of a few MB's.

Figure 10:
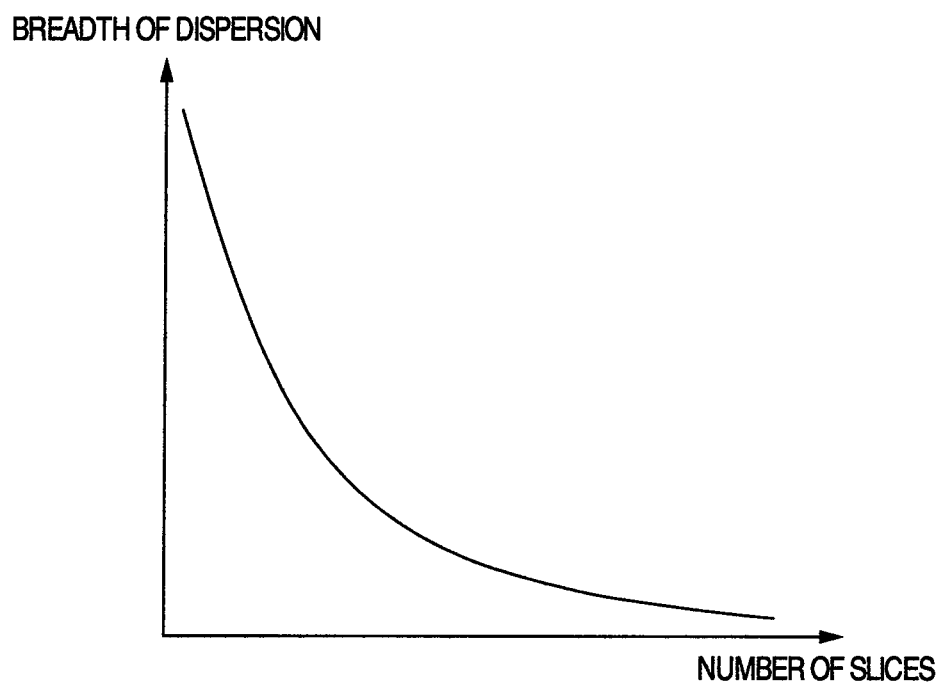
FIG. 10 is a graph showing an example of a relationship between the number of slices and the breadth of dispersion, associated with Embodiment 1.

Here, a description will be given specifically using FIG. 10. FIG. 10 shows a graph of number of slices and slice number dispersion. The expression "number of slices" refers to the number of slices to make converge to the target bit number, when one MB line is taken to be one slice, the number of slices e.g. working out to 68 (1088/16=68) in the case where it is desired to fix the number of bits by picture for full HD image. The expression "breadth of dispersion" refers to the value of the dispersion calculated with the target bit number as the average. From FIG. 10, it is seen that the more the number of slices to make converge to the target bit number is lowered, the more dispersion increases and, on the contrary, the more the number of slices is increased, the more dispersion decreases.

In order to implement a delay reduction to the order of several milliseconds, it is desired to reduce the number of slices to make converge to the target bit number in order to advance the start timing of the decoding, but in order for image failure not to occur, there are cases where it is not possible to speed up the delay time even if the number of slices is lowered, since it is not possible to start decoding until the maximum value of the actual generated bit quantity has been reached. E.g., if the target bit number of one slice is taken to be 1 kbyte and the maximum value of the actual generated bit quantity is taken to be 3 kbytes, there ends up being generated a delay corresponding to 3 kbytes (3 slices) in the end, since decoding must be started after waiting for 3 kbytes worth of data to accumulate in the video reception device.

A technique of resolving the aforementioned issue will be mentioned in the following. In a video communication system carrying out strengthening of error robustness by means of redundant data, the bit number in units of a prescribed number of MB's is fixed by controlling the number of times that redundant data are inserted in response to the number of bits generated in the packet processing part, since it is acceptable for the combined bit number of the original data and the redundant data to be fixed. As for the aforementioned packet processing part, it corresponds to multiplexer 130 in the block diagram of FIG. 1 and has a function of generating TS packets from a video stream and a function of generating redundant data.

As an example, an explanation will be given regarding the case of taking the target bit number of one slice during communication to be 4 kbytes and transmitting three redundant data items in addition to the original data, i.e. the case of setting the encoder target bit number of one slice to be 1 kbyte. Here, the expression "original data" refers to stream data that have been turned into TS packets and constitute a plurality of TS packet groups. The expression "redundant data" refers to data that are the same as the original data, the stream data inside the TS packets, and, regarding the headers, the video reception device is modified to be able to distinguish original data and redundant data.

Figure 11:
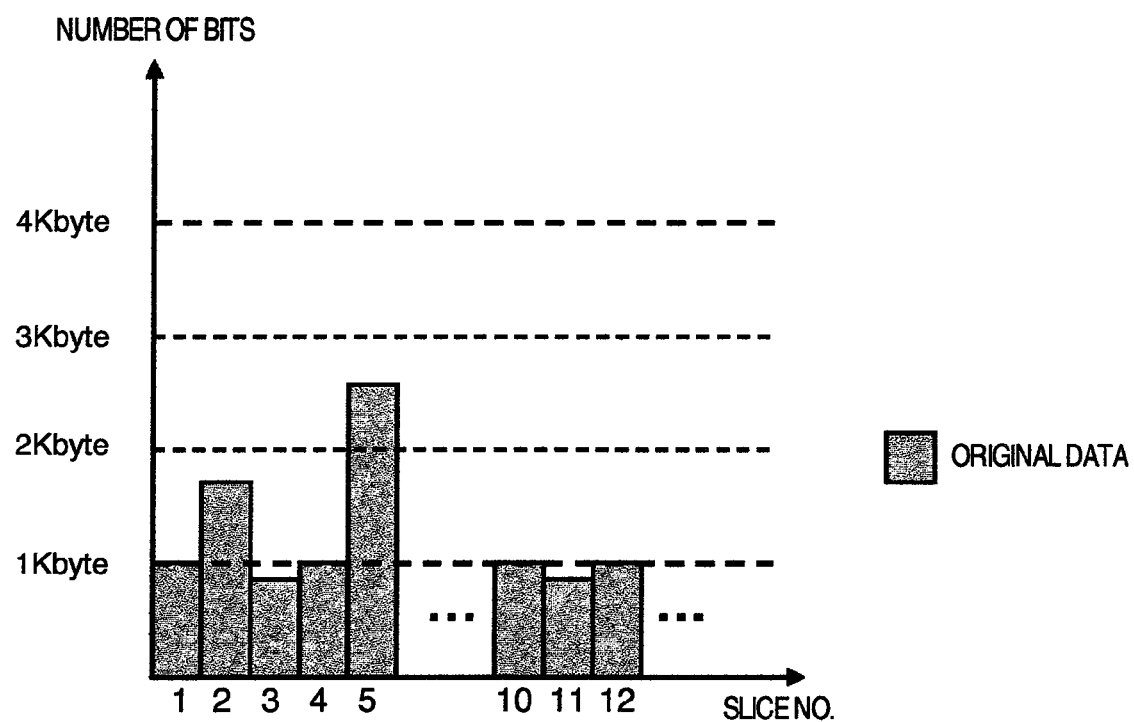
FIG. 11 is a diagram showing an example of the number of bits by slice, associated with Embodiment 1.

FIG. 11 shows an example of number of bits by slice. As for the number of bits by slice, from the result of the graph of FIG. 10, the breadth of dispersion becomes big. Because of that, although encoding was carried out taking the target bit number to be 1 kbyte, the result is that slice #2 is approximately 1.6 kbytes and slice #5 is approximately 2.5 kbytes.

Figure 12:
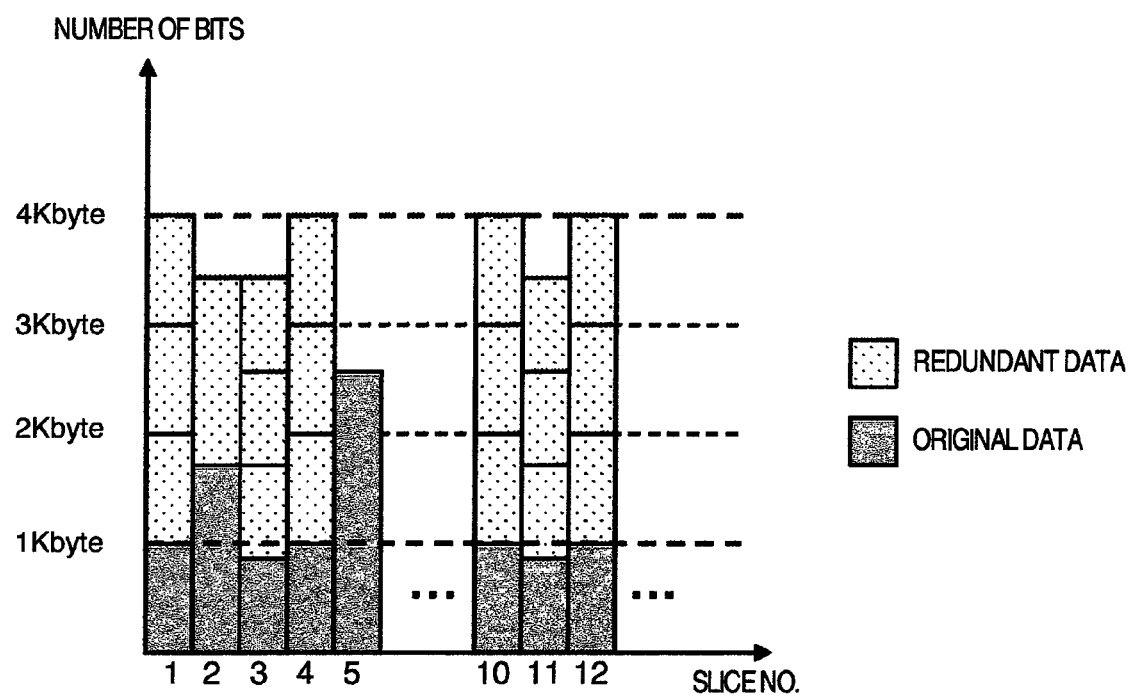
FIG. 12 is a diagram showing an example of redundancy by slice, associated with Embodiment 1.

FIG. 12 is an example in which the number of times that redundant data are inserted is controlled so that the coded original data and the redundant data work out to a total of 4 kbytes. Since slice #2 is 1.6 kbytes, only one redundant data item is generated. Moreover, slice #5 has original data that exceed 2 kbytes so, since 4 kbytes would end up being exceeded if redundant data are generated, redundant data are not generated. As for the other slices that are 1 kbyte or less, if three redundant data items are generated, it is possible to restrain all the slices to be 4 kbytes or less. If the number of times of inserting these redundant data is expressed as a formula, it works out to an integer value obtained by dividing (number of data bits of one slice during communication) and (the number of generated bits after the encoding of one slice) and discarding the value after the decimal point of the division.

In this way, by controlling the number of times that redundant data are inserted in response to the number of generated bits, it becomes possible to restrain the number of bits with one slice, a low number of MB processes, to a fixed limit or less. Since the number of bits of one slice is fixed, it is possible to start decoding processing at the stage when one slice's worth of data has been received with the video reception device. As a result, communication with low delay, the delay of one slice, becomes possible. Further, it becomes possible to attach error robustness to a maximum without exceeding the target bit number.

Figure 13:
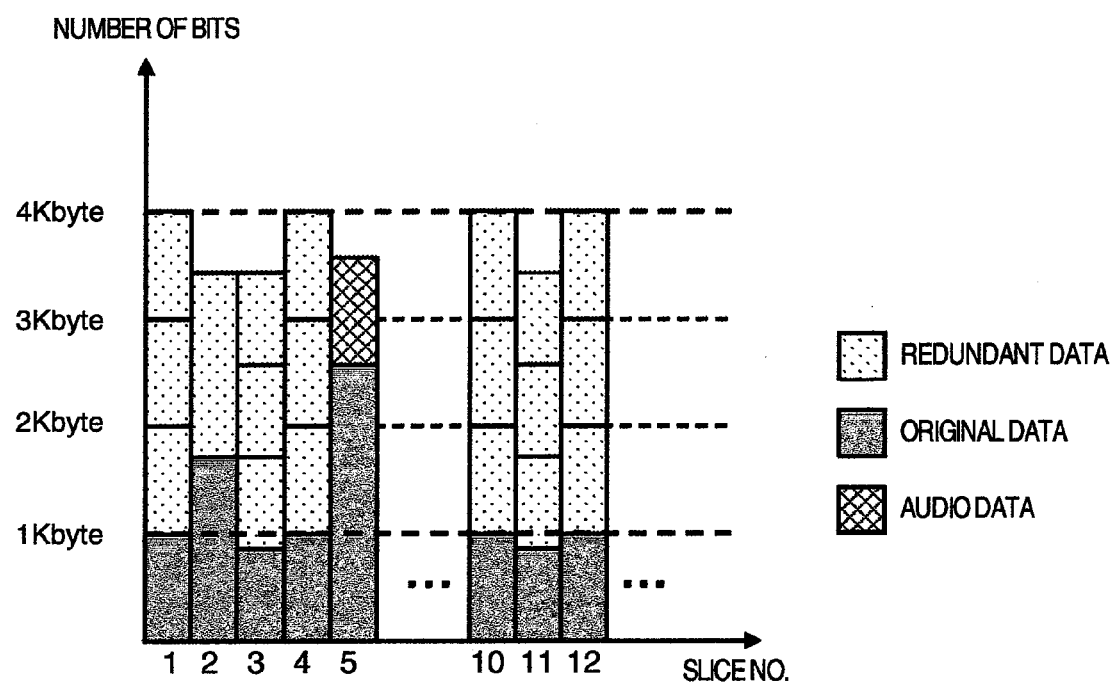
FIG. 13 is a diagram showing an audio data insertion example associated with Embodiment 1.

FIG. 13 shows an example of inserting audio TS packets without generating delay. The aforementioned packet processing part (multiplexer 130) is further taken to be one that possesses the function of grouping audio data into TS packets. In this packet processing part, the number of bits of the audio TS packet and the target bit number are compared and in case the number of bits is lower than the target bit number and does not exceed the target bit number even if an audio TS packet is inserted, an audio TS packet is inserted. In FIG. 13, a 1-kbyte audio TS packet is inserted into slice #5, since it does not occur that the target bit number is exceeded even if it is inserted into slice #5. As for this audio TS packet, it is possible, by inserting the audio TS packet into a slice with a low number of bits while imposing that lip synchronization be obtainable, to communicate data without generating delay. In FIG. 13, an example was explained in which an audio TS packet is inserted, but data for video reception device control, rather than an audio TS packet, are also acceptable.

In the aforementioned Embodiment 1, it was described that the stream data of the redundant data are taken to be identical to the original data, but rather than being a dead copy, the data may be data enabling restoration of the original data when an error has been generated in the original data such as error correction coded data or data obtained by further compressing the original data. Further, as for the method of generating these redundant data, it may be modified in response to the original data volume. Further, an example was described in which the redundant data were controlled in slice units, but the unit with which redundancy is created may be a unit such as a prescribed MB processing unit, a prescribed byte number unit, or a TS packet unit.

Second Embodiment

In Embodiment 2 of the present invention, a description will be given regarding an error detection method associated with the demultiplexer. Since the configuration is the same as that of FIG. 1, a description thereof will be omitted.

In the example shown in FIG. 5, slice A 433 was taken to follow immediately after slice A 432, but in the present embodiment, video transmission device 100 adds, between slice A 432 and slice A 433, information about slice A 432, e.g. a checksum value, a CRC (Cyclic Redundancy Check) value, or error detection coding such as slice length. Demultiplexer 310 receives the video stream and, on the occasion of loading to buffer 320, carries out error detection using an error detection code. In case an error is detected from slice A 432 and an error was not detected from slice A 433, demultiplexer 310 outputs slice A 433 to decoder 330.

As for the video communication system shown in the present embodiment, it is possible, by means of the aforementioned processing, to lower the design cost, since no exchange of demultiplexer and decoder control signals is necessary at the time of video stream error detection.

Third Embodiment

In Embodiment 3 of the present invention, a description will be given regarding the coding method of the encoder in the video transmission device. Since the configuration is the same as in FIG. 1, a description thereof will be omitted.

In case encoder 110 carries out coding of video data with the MPEG-2 format, a common buffer model with an encoder and decoder called VBV (Video Buffering Verifier) is assumed and bit rate control of the video stream is carried out.

Figure 8:
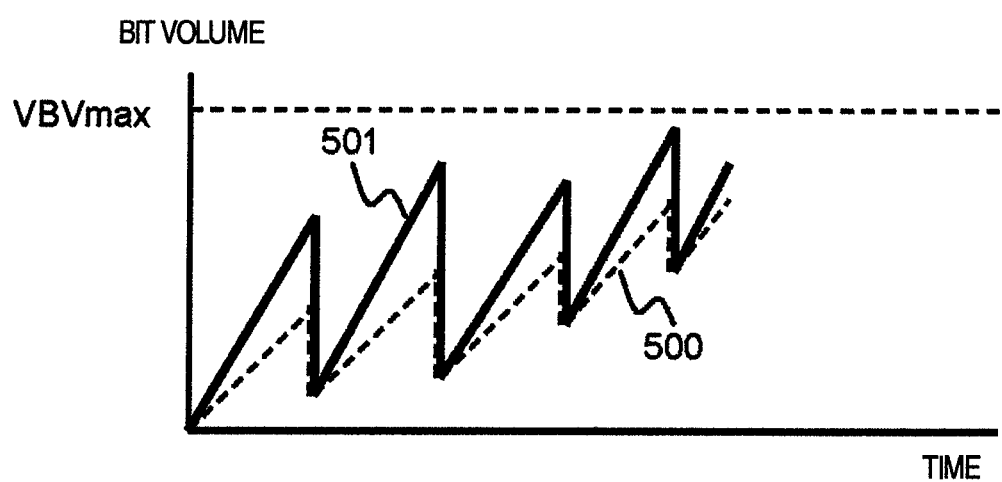
FIG. 8 is a diagram showing a progress example of the bit volume of a VBV associated with Embodiment 3.

In FIG. 8, the progress of the bit quantity of a VBV is shown. The ordinate represents the bit volume held by the VBV and the abscissa represents time. In the VBV model, when the decoder carries out control of instantaneously extracting the bits output by the encoder, it is verified that the VBVmax value, the maximum VBV value, is not exceeded, and that it does not fall below 0. As shown in bit volume change 500, the encoder estimates the output bit quantity from the output bit quantity of the video stream or the quantization coefficient and carries out control of the quantization coefficient to satisfy the VBV buffer model.

As shown in FIG. 5, in case slice A is output redundantly in the picture layer, the bit rate of the output video stream becomes twice that of the case where it is not output redundantly. Accordingly, as shown in bit volume change 501 of FIG. 8, the slope of the output bit volume becomes twice as steep. Encoder 110, shown in the present embodiment, assumes output bit quantity change 501 rather than video stream bit quantity change 500 and carries out control of the quantization coefficient so that the VBV buffer does not exceed VBVmax to overflow.

By means of the aforementioned processing, when a video stream of the video communication system shown in the present embodiment is decoded, it becomes possible to continue the transfer of video data without the VBV model's causing an overflow or underflow.

In the present embodiment, an example was cited in which two slices were included, but the effect of the present invention can be obtained irrespective of the number of times the data are output redundantly.

Fourth Embodiment

In Embodiment 4 of the present invention, a description will be given regarding the TS packet generation method of a multiplexer associated with a video transmission device. Since the configuration is the same as that of FIG. 1, an explanation thereof will be omitted.

Figure 2:
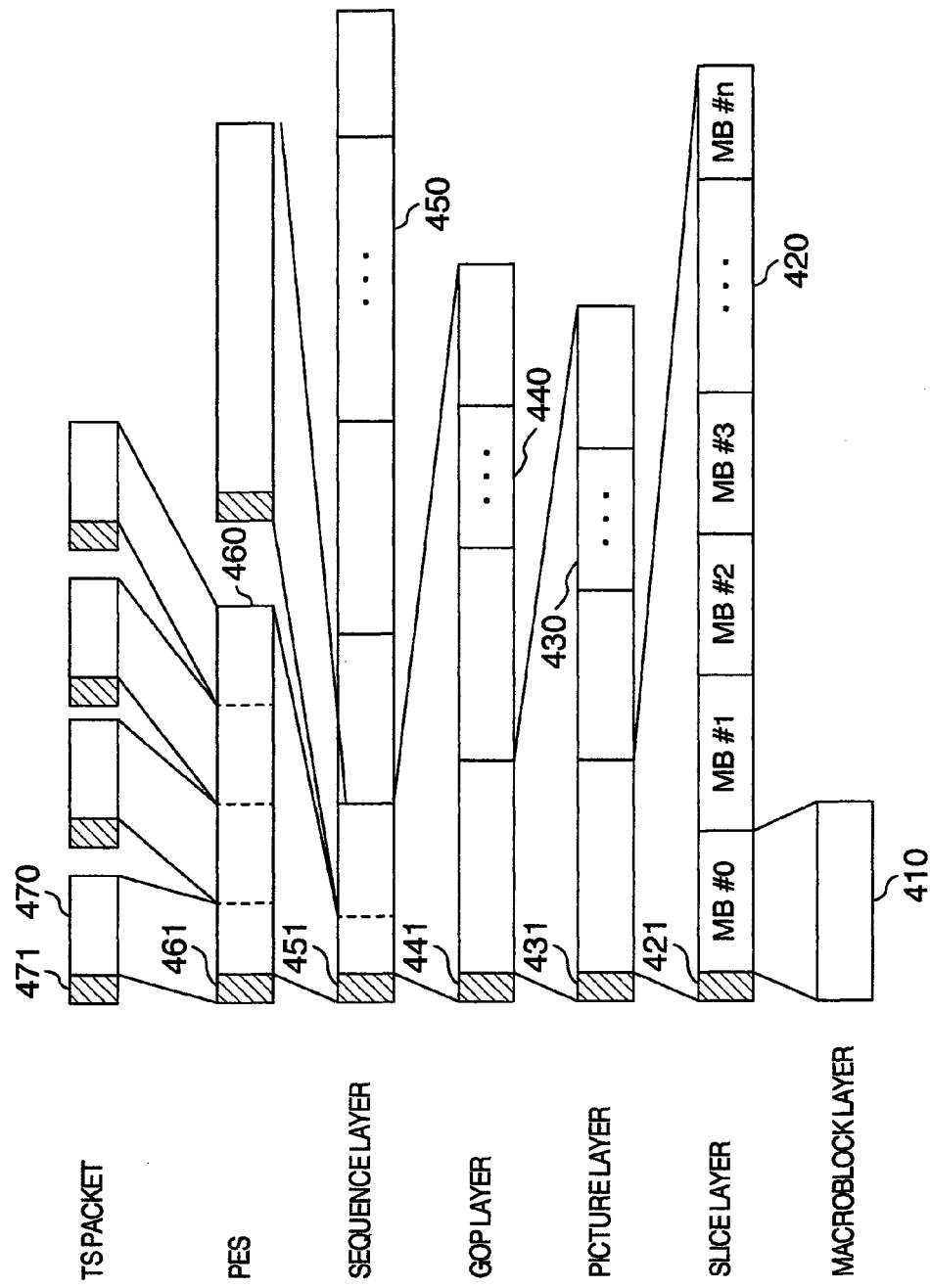
FIG. 2 is a diagram showing a data layer structure example of a video stream associated with Embodiment 1.

As shown in FIG. 2, in a TS packet that is output by multiplexer 130, there is included a TS header 471 and there is included a PID which is an identification number for distinguishing the video stream included in the TS packet and data included in other TS packets.

In the present invention, after multiplexer 130 has output the data of the slice layer of the video stream as a TS packet with a first PID, it turns data of the same slice layer into a TS packet with a second PID and outputs the same.

In FIG. 6, there is shown an example of packetization. Slice A 432 is divided up into four TS packets and transmitted. A first PID is added to a TS header 471 of the head TS packet, the first PD also being added to the following TS packet group 475. A second PID is added to a TS packet header 473 and the second MD is added to the following TS packet group 476. Here, as for a TS payload 472 and a TS payload 474, which are slice data segments, the same data are stored, the same also being true for the TS payloads that respectively follow.

Demultiplexer 310 extracts the video stream from both the first PID and the second PID TS packets, separates off domains in buffer 320 and stores the packets. Decoder 330 decodes the first PID TS packet and, if it detects a decoding error, reads out the TS packet from the second PID to carry out decoding and correct the error.

In the aforementioned FIG. 6, there was shown an example in which original data and redundant data were transmitted alternately in slice units using a first PID for original data and a second PID for redundant data, but the original data and the redundant data may also be transmitted alternately with TS packet units rather than slice units.

Together with the fact that the same effect can be obtained as with Embodiment 1, with the present embodiment it becomes possible, by means of the aforementioned processing, to connect some common conventional video reception device that does not carry out error correction using video streams obtained from two PID's in network 200 since there is no change from a normal MPEG-2 stream in case only the video stream of the first PID is demultiplexed.

In FIG. 17, another TS packet generation method is shown. Numerals 800 to 804, 810 to 814, and 820 to 824 respectively designate one TS packet which exhibits a header+payload structure. TS packets 801 to 804 are original data of slice #0, TS packets 811 to 814 are redundant data of slice #0, and TS packets 821 to 824 are original data of slice #1. Also, the abscissa represents time, the packets being output from video transmission device in order from TS packet 800 on the left.

TS packets 800, 810, and 820 are not stream data TS packets but identification TS packets for identifying original data and redundant data and are inserted at the head of a slice. As for these identification TS packets, the PID's for identifying original data and redundant data are taken to be identification PID's that are separate from the PID's of the video data. By inserting one of these identification TS packets at the head of a slice, in case a TS packet with an identification PID is received in the video reception device, the TS packets that are received until the following identification PID TS packet are stored, by separating domains in buffer 320, as data (original data or redundant data) indicated by the identification PID.

In this way, by inserting, at the head of a slice, an identification TS packet indicating original data and an identification TS packet indicating redundant data, it becomes possible to make a distinction in the video reception device, even if both original data and redundant data both have identical packets.

In Embodiment 4, a description is given with an example in which the number of redundant data insertions is 1, but it is also possible to make an increase to 2 or more. As for the PID's in this case, by changing the PID's to something like a third PID and a fourth PID, it becomes possible to distinguish the redundant data in the video reception device.

Fifth Embodiment

In Embodiment 5 of the present invention, a description will be given regarding a case in which UWB (Ultra Wide Band) communication has been adopted as the means of communication.

Figure 14:
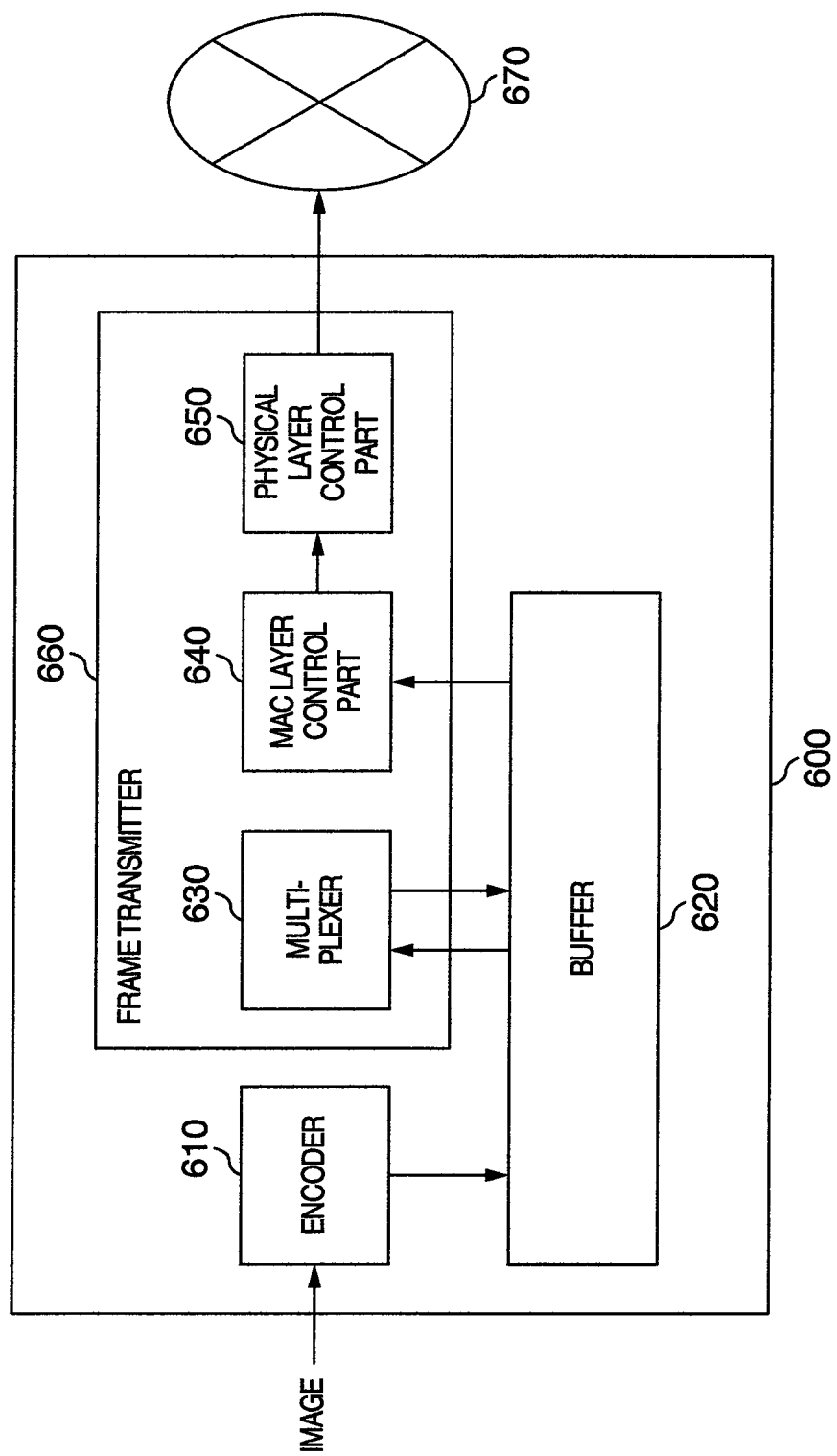
FIG. 14 is a diagram showing an example of a video transmission system associated with Embodiment 5.

FIG. 14 shows a UWB video transmission device 600. An encoder 610 encodes an input image, generates a stream, and stores the same in a buffer 620. A multiplexer 630 reads out the aforementioned stream from buffer 620, generates original data TS packets and redundant data TS packets that are copied from the aforementioned stream, and stores the same in buffer 620. A MAC (Medium Access Control) layer control part 640 reads out a fixed data volume of the aforementioned TS packets from the buffer, generates frames needed (adding headers and error correction coding) for carrying out UWB communication, and sends the same to a PHY (Physical) layer control part 650. PHY layer control part 650 modulates the aforementioned frames and sends the same to a network 670. Here, the aforementioned multiplexer 610, MAC layer control part 640, and PHY layer control part 650 are consolidated and are called a frame transmission part 660.

Figure 15:
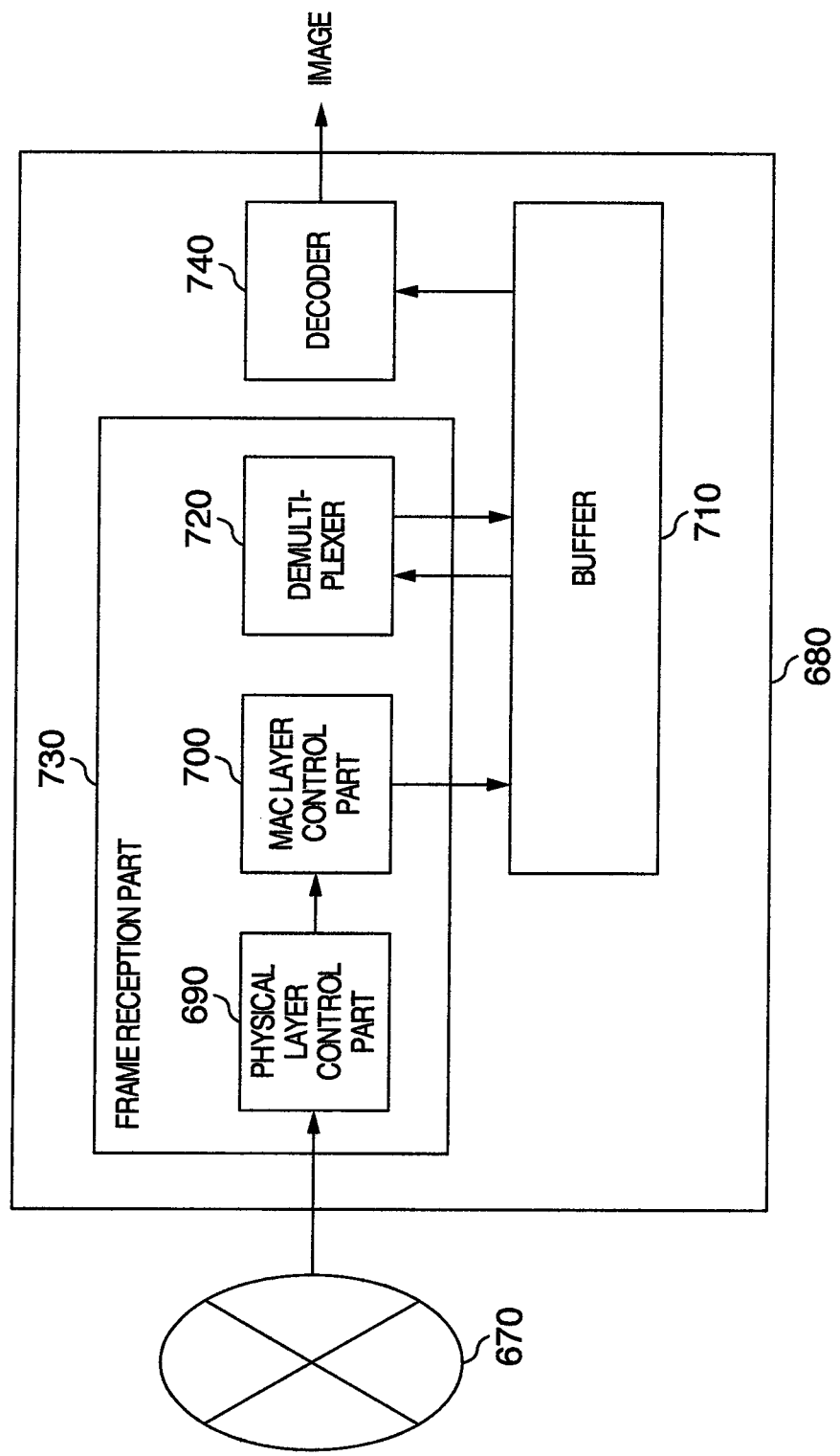
FIG. 15 is a diagram showing an example of a video reception system associated with Embodiment 5.

FIG. 15 shows a UWB video reception device 680. In a PHY layer control part 690, demodulation of data received from network 670 is carried out. In MAC layer control part 700, it is discriminated whether or not there is an error in the frame by means of error correction coding attached to the frame and, in case there is an error in the frame which and a restoration cannot be made, the data inside the same frame are completely discarded. In case there was no error or there was an error but error correction was successful, the demodulated TS packet is stored in a buffer 710. In a demultiplexer 720, the aforementioned TS packet is changed into a stream and stored in buffer 710. At this point, it is discriminated, using the PID of the TS packet or the continuity of the continuity counter, whether the packet is an original TS packet or a redundant TS packet. In case no original TS packet is missing, the original TS packet is stored in the buffer and redundant TS packets are removed. Also, in case an original TS packet is missing, a redundant TS packet is used as the original TS packet. Here, the aforementioned PHY layer control part 690, MAC layer control part 700, and demultiplexer 720 are consolidated and are called a frame reception part 730. A decoder 740 decodes the stream stored in buffer 710 and outputs the decoded image to the outside.

In this way, in the case of carrying out communication while carrying out error correction processing in frame units, when there is generated an error that cannot be error corrected, the result is that there occurs data loss in units of frames. Accordingly, in multiplexer 630 of UWB transmission device 600, it is possible to avoid that the redundant data ends up being absent together with the original data by generating redundant data for each frame, which is the processing unit of the MAC layer control part. Also, unlike Embodiment 1, since it is understood before starting decoding whether or not there is an error, a wide range of error countermeasures, such as not decoding all of the slice in which an error has occurred and decoding so far as places with regular data, become possible. Further, in case no error was discovered at the stage of error judgment, since it is ensured that there are no bit errors of the same frame, holding the video stream of the redundant data in the buffer after demultiplexer processing becomes unnecessary, like in Embodiment 4. Accordingly, it is possible to reduce the capacity of the buffer after demultiplexer processing.

In the case of the UWB transmission device of Embodiment 5, in the aforementioned MAC layer control part 700, if one frame's worth of data do not accumulate, it is not possible to communicate the frame. E.g., if the frame communication unit is 500 bytes, taking one MB line to be one slice and the stream data of the first slice is 200 bytes, the stream data of the second slice is 250 bytes, and the stream data of the third slice is 250 bytes, it is taken that redundant data are not transmitted. In this example, since 500 bytes of stream data do not accumulate until the encoder has processed partway into slice #3 and transmission cannot be made, MAC layer control part 700 ends up delaying the data of slice #1 slightly less than two slices. Also, in the case of transmitting one redundant data item, even if the original data of slice #1 and the redundant data obtained by copying the aforementioned original data of slice #1 are added up, it amounts to 400 bytes and since this amounts to less than 500 bytes, the unit of frame transmission, the data end up entering into the same frame. In a video communication system using wireless communication such as UWB communication, since data loss occurs in units of frames and since in this case, the redundant data also are lost at the same time, the same end up having no meaning. Accordingly, these two issues are resolved by inserting TS packets for stuffing.

Figure 16:
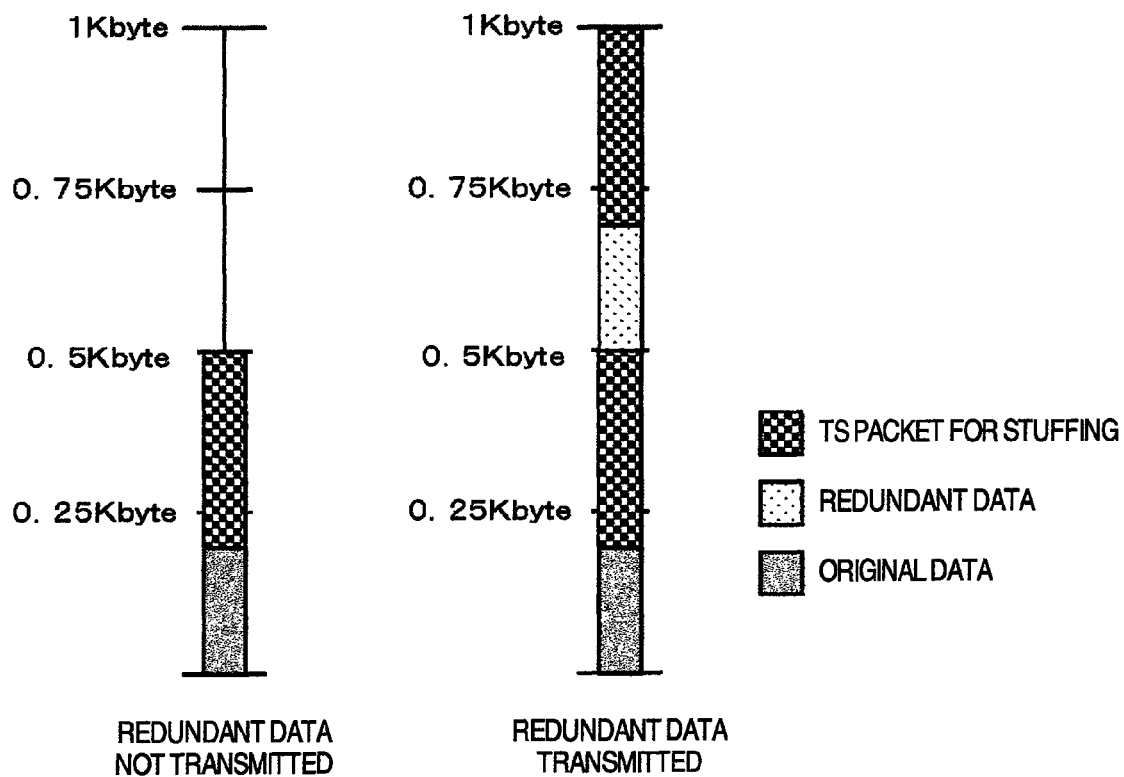
FIG. 16 is a diagram showing an example of inserting TS packets for stuffing, associated with Embodiment 5.

FIG. 16 is an example in which, in the aforementioned example, a stuffing TS packet has been inserted into the original data of slice #1. Both in the case of transmitting redundant data, and of not transmitting the same, it is possible to resolve the two aforementioned issues by inserting a stuffing TS packet so that, in slice units, the data work out to 500 bytes, the frame communication unit. Here, by changing the PID of the header of the aforementioned stuffing TS packet into a value that is different from that of the TS packet of the video stream, it is possible, by just checking the PID inside the video reception device, to eliminate the stuffing TS packet only.

In FIG. 16, it was explained that a stuffing TS packet is inserted so that it is possible to identify the PID of the video reception device and remove the stuffing TS packet, but stuffing data, rather than a TS packet, are also acceptable. Further, rather than in units of slices, it is also acceptable to insert stuffing data for each group of a prescribed number of MB processes.

Next, an explanation will be given of a specific method of generating TS packets. In a video communication system of Embodiment 5, since data are transmitted in units of frames, redundancy units also work out to being frame units.

In FIG. 18, there is cited an example of a TS packet generation method. Each of the reference numerals 900 to 904, 910 to 914, and 920 to 924 represents a TS packet, numerals 901 to 904 and 921 to 924 representing original data TS packets and numerals 911 to 914 representing redundant data of TS packets 901 to 904 and being complete copies of TS packets 901 to 904. Numerals 900, 910, and 920 represent TS packets for identification, identification TS packets being inserted at the head of a frame. Further, since it is not possible to make a judgment as far as a packet loss with a PID alone, the loss is discriminated using a continuity counter. Specifically, the continuity counters are taken to have consecutive values: 0 for the continuity counter of the identification TS packet of the original data and redundant data of frame #0, 1 for the continuity counter of the identification TS packet of frame #1, and 2 for the continuity counter of the identification TS packet of frame #2.

In FIG. 19, there is shown a flowchart of the judgment method of data loss in demultiplexer 720 and a redundant data destruction method. First, in Step S100, it is judged whether or not the PID of an input TS packet is an identification PID. In the case of "Yes", the process of Step S101 is carried out and in the case of "No", the process of Step S106 is carried out. In Step S106, there is carried out the process of converting from TS packets to stream data in case the packet process flag is "ON" and in case the packet process flag is "OFF", the TS packet is destroyed. Further, the aforementioned packet process flag takes on a value storing the process result of the identification TS packet of the previous time, an overwrite being carried out with the identification TS packet process. In Step S101, the identification TS packet continuity counter is compared with the continuity counter of the identification TS packet of the previous time and it is judged whether the same are consecutive. In case the judgment result of Step S101 is "Yes", since it is the data of the first arrived TS packet, the packet process flag is set to "ON" in Step S102. Moreover, in case the judgment result of Step S101 is "No", there is carried out a judgment as to whether the value is the same as for the continuity counter of the identification TS packet of the previous time of Step S103. In case the judgment result of Step S103 is "No", the error process of Step S104 is executed since it signifies that the packet is lost. Moreover, in case the judgment result of Step S103 is "Yes", the packet process flag is set to "OFF" in Step S105, since it signifies that the same data were processed (redundant data) with the identification TS packet of the previous time.

In the foregoing, there was shown an example in which the loss of a TS packet is judged using a continuity counter, but it is acceptable not only to use a continuity counter but also to insert a counter value into the payload. By inserting a counter value into the payload, it was not possible to detect an error in the case of using a four bit wide continuity counter when a multiple 16 of frames are lost, but in the case of inserting a counter value that is greater than four bits, it is possible to raise the rate of detection of packet loss errors.

In FIG. 20, there is shown another example of a redundant data generation method. Numerals 951 to 954 and 971 to 974 represent original data TS packets and numerals 961 to 964 represent TS packets of redundant data of packets 951 to 954. Here, packets 961 to 964 are not complete copies of packets 951 to 954 but only have the TS packet headers modified so that TS packet loss detection and destruction of redundant data can be carried out with demultiplexer 720. Specifically, the PID's are taken to be PID's that differ by original data and redundant data. Also, the continuity counter is taken to be one that is incremented with the frame units of the original data, the continuity counter of the original data being used for the redundant data. In the example of FIG. 20, TS packets 951 to 954, since the same are original data, the first PID and the continuity counter are taken to be 0. As for TS packets 961 to 964, since the same are redundant data, the second PID and continuity counter work out to 0, since the same are the redundant data of the original data having a continuity counter of 0. Since TS packets 971 to 974 are original data, the first PID and continuity counter work out to 1, since the same are in the following original data frame.

Figure 21:
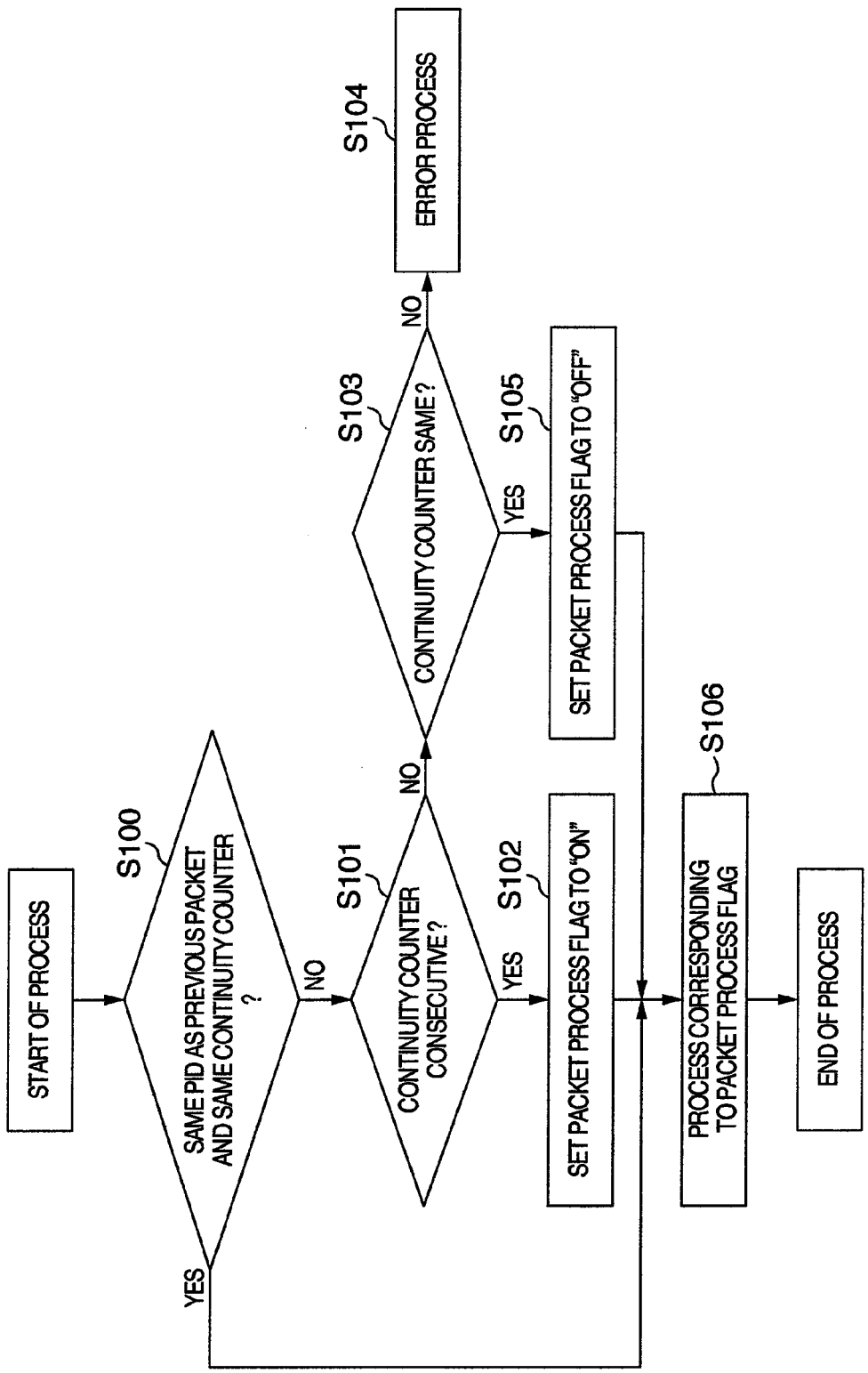
FIG. 21 is a diagram showing an example of a data absence judgment and redundant data destruction method associated with the TS packets in FIG. 20.

In FIG. 21, there is shown a flowchart of the judgment method of data loss in demultiplexer 720 and a redundant data destruction method. The steps that perform like processes as in FIG. 19 have like reference numerals attached. First, it is judged whether the TS packet PID input in Step S107 is the same PID as that of the previous packet and has the same continuity counter. In the case of "Yes", the process of Step S106 is carried out and in the case of "No", the process of Step S101 is carried out. In case the packet process flag is "ON", Step S106 carries out the process of making a conversion from a TS packet to stream data and in case the packet process flag is "OFF", the TS packet is destroyed. Further, the aforementioned packet process flag is a value holding the processing result of the previous time. In Step S101, the continuity counter of the identification TS packet is compared with the continuity counter of the TS packet of the previous time and it is judged whether the same are consecutive. In case the judgment result of Step S101 is "Yes", since what is concerned is data of the first arrived TS packet, the packet process flag is chosen to be "ON" in Step S102, and the process of Step S106 is carried out. Moreover, in case the judgment result of Step S101 is "No", there is carried out a judgment as to whether the continuity counter has the same value as that of the previous Step S103 identification TS packet. In case the judgment result of Step S103 is "No", since it signifies that there is packet loss, an error process is executed in Step S104. Moreover, in case the judgment result of Step S103 is "Yes", since it signifies that the same data were processed in the TS packet of the previous time (redundant data), the packet process flag is chosen to be "OFF" in Step S105, and the process of Step S106 is carried out.

In the aforementioned Embodiment 5, an explanation was given with an example in which UWB communication was adopted as the communication means, but the invention is not one limited UWB, other communication methods like IP communication or frame unit communication also being acceptable. Further, in case an error is generated during communication and a correction has not been possible, it is mentioned that the data of the same frame are discarded, but the same data may be transferred to a later stage without being discarded. Further, as for Embodiment 5, it is also possible to control the number of times of insertion of redundant data in response to the number of bits generated by the encoder for each prescribed MB process, in accordance with Embodiment 1.

Sixth Embodiment

Figure 22:
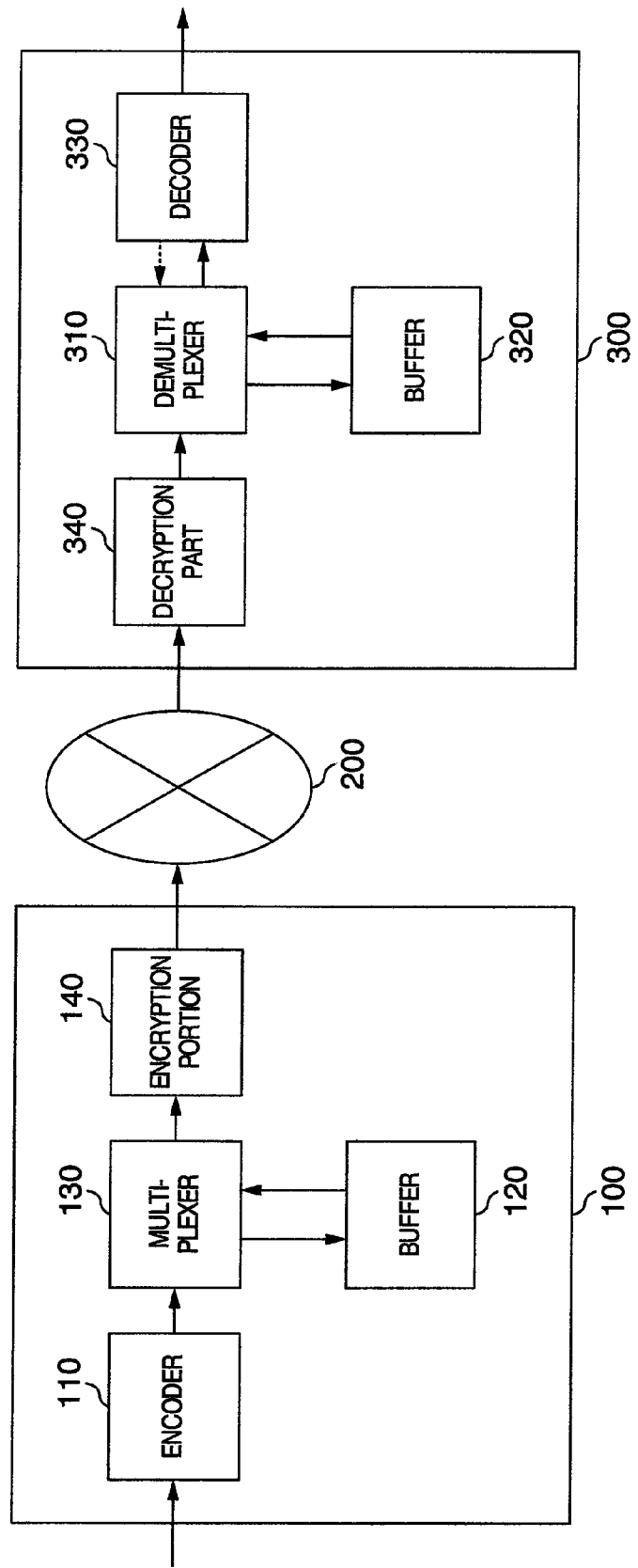
FIG. 22 is a diagram showing an example of a video communication system associated with Embodiment 6.

FIG. 22 is an example of outputting data that are encrypted at the time of output from a video transmission device. Functional blocks that are the same as in FIG. 1 have the same reference numerals and an explanation thereof is omitted. An encryption part 140 carries out encryption of input data and has a function of outputting the encrypted data and a decryption part 340 has a function of converting back the aforementioned encrypted data into the aforementioned input data. In FIG. 22, encryption is carried out before transmitting a TS packet generated by means of multiplexer 130 to the network and in a video reception device, the data are transferred to a demultiplexer after undoing the encryption in decryption part 340. In this way, by transmitting with the video transmission device data with data on which encryption has been carried out, it becomes possible to devise the system so that, even if seen by a third party, the contents are not understood.

Further, in Embodiment 6, encryption is performed for each TS packet, but in the case of Embodiment 5, if encryption is performed for each frame, or encryption is performed for each TS packet, or the like, and in the end the data contents are encrypted, the encryption part may be arranged anywhere.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A video transmission device, comprising:
    an encoder coding input video data and outputting a video stream; and
    a packet processing part grouping the video stream output from said encoder into packets and outputting the same to a communication path, wherein:
    said packet processing part
        generates original data clusters, encoded with a first target bit rate by the encoder, in which packets for a group of a prescribed number of macro block (MB) processes are consolidated into one original data cluster,
        generates redundant data for correcting data errors of corresponding one original data cluster, stream data of the redundant data holding the same data as that of the corresponding one original data cluster, and
        determines, based on a data amount of the corresponding one original data cluster, how many times the redundant data can repeatedly be sent together with the corresponding one original data cluster within a second target bit number obtained by converting a second target bit rate during communication into the prescribed number of MB processes the redundant data and the corresponding one original data cluster filing in the second target bit number while not exceeding the second target bit number, and
    the first target bit rate is smaller than the second target bit rate.

2. A video transmission device according to claim 1, wherein said packet processing part further has a function of grouping non-video stream data into packets and multiplexing the same and, in response to the number of bits of said corresponding one original data cluster, inserts the non-video stream data.

3. A video transmission device, comprising:
    an encoder coding input video data and outputting a video stream; and
    a packet processing part grouping the video stream output from said encoder into packets and outputting the same to a communication path, wherein:
    said packet processing part
        generates original data clusters, encoded with a first target bit rate by the encoder, in which packets for a group of a prescribed number of macro block (MB) processes are consolidated into one original data cluster,
        generates redundant data holding the same data as corresponding one original data cluster, stream data of the redundant data holding the same data as that of the corresponding one original data cluster, and inserts an identification packet identifying said corresponding one original data and said redundant data at the head of a prescribed number of MB processes,
        determines, based on a data amount of the corresponding one original data cluster, how many times the redundant data can repeatedly be sent together with the corresponding one original data cluster within a second target bit number obtained by converting a second target bit rate during communication into the prescribed number of MB processes, the redundant data and the corresponding one original data cluster filing in the second target bit number while not exceeding the second target bit number, and
    the first target bit rate is smaller than the second target bit rate.

* * * * *